3,223,732
TRIACETYL- AND TETRAACETYLMETHYLENE-
DIAMINE AND PROCESS
Wilhelmus J. C. Viveen and Cornelis U. Kloosterman, Deventer, Netherlands, assignors to Koninklijke Industrieele Maatschoppij vorheen Noury & van der Lande N.V., Deventer, Netherlands, a corporation of the Netherlands
No Drawing. Original application June 2, 1960, Ser. No. 33,397, now Patent No. 3,163,606, dated Dec. 29, 1964. Divided and this application Aug. 12, 1963, Ser. No. 301,595
Claims priority, application Netherlands, June 6, 1959, 239,952; Great Britain, June 19, 1959, 21,220/59; July 29, 1959, 26,061/59; Oct. 13, 1959, 34,695/59
5 Claims. (Cl. 260—561)

This invention relates to novel organic compounds and mixtures thereof, as well as to methods of preparing the same. Said compounds serve as activators for perborates and other peroxy compounds in bleaching and washing compositions.

This application is a division of application Serial No. 33,397, filed June 2, 1960, and now U.S. Patent No. 3,163,606.

It is an object of this invention to provide certain novel compounds and mixtures of said compounds for use as activators for inorganic peroxy compounds in washing and bleaching compositions.

It is a further object of this invention to provide a process for producing said novel activator compounds.

Further objects and attendant advantages of this invention will become apparent from the following more detailed description.

The compounds of this invention may be represented by the formula

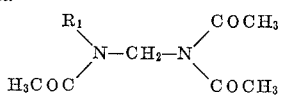

in which $R_1$ represents a hydrogen-atom or a $COCH_3$-group.

These new compounds selected from the group consisting of N,N,N'N'-tetraacetylmethylenediamine and N,N,N'-triacetylmethylenediamine and mixtures thereof according to the invention may be obtained by either of the following two methods.

Thus, it is possible to prepare N,N,N'N'-tetraacetylmethylenediamine by allowing to react ketene on a mixture of N,N'-diacetylmethylenediamine and an inert solvent in the presence of an acid-reacting catalyst.

This reaction may be executed in benzene as an inert solvent at a temperature of 30–80° C., preferably however at a temperature of 50–65° C., in the presence of 0.5–3%, preferably of 2% by weight of p-toluenesulphonic acid calculated on N,N'-diacetylmethylenediamine. The N,N,N'N'-tetraacetylmethylenediamine formed may be recovered from the reaction mixture in any conventional way.

According to the invention, N,N,N'N'-tetraacetylmethylenediamine may, however, also be obtained by acetylating N,N'-diacetylmethylenediamine with the aid of acetic acid anhydride while eliminating continuously the acetic acid formed during the reaction, e.g. by distillation.

If during the reaction between diacetylmethylenediamine and acetic acid anhydride, the acetic acid liberated is not eliminated from the reaction mixture, mainly N,N,N'-triacetylmethylenediamine is formed.

When only part of the quantity of acetic acid that theoretically could be formed during the acetylation is eliminated from the reaction mixture, mixtures are obtained that appear to contain triacetylmethylenediamine and tetraacetylmethylenediamine with the quantity of the former increasing as less acetic acid is eliminated.

The following examples are presented to further illustrate the invention, and should not be considered as limiting thereof.

EXAMPLE I

Preparation of N,N,N'N'-tetraacetylmethylenediamine (A) 200 g. of N,N'-diacetylmethylenediamine, which may be prepared from acetamide and paraformaldehyde, were suspended with stirring in 1500 cc. dry benzene. After addition of 4 g.p-toluenesulphonic acid as a catalyst, ketene was introduced until all the N,N'-diacetylmethylenediamine had gone into solution which occurred within 7 hours, at 50°–65° C. Thereupon, the reaction mixture was cooled in ice; 159 g. of tetraacetylmethylenediamine crystallized; melting point 95°–96° C. By concentrating the mother liquor to one-fourth volume and cooling, another 137 g. of tetraacetylmethylenediamine were obtained.

(B) 325 g. (2.5 mols) N,N'-diacetylmethylenediamine (M.P. 200–200.5° C.) is dissolved by heating in 1530 g. (15 mols) acetic acid anhydride (98%). With the help of a fractionating column the acetic acid formed during the reaction is distilled off simultaneously at a bottom temperature of 140–145° C. in a period of 14 hours.

The reaction comes to an end when the distillate has reached the boiling point and refractive index of pure acetic acid anhydride.

The distillate amounting to 425 g. contains 330 g. acetic acid.

By distillation under reduced pressure all the acetic acid anhydride still present in the reaction mixture is removed yielding 523 g. crude product (theor. 535 g.).

After recrystallization from 523 cc. isopropyl alcohol 480 g. (=2.25 mols) pure tetraacetylmethylenediamine, M.P. 95–96° C., is obtained.

EXAMPLE II

Preparation of N,N,N'-triacetylmethylenediamine 325 g. (2.5 mols) diacetylmethylenediamine (M.P. 200–200.5° C.) is dissolved by heating in 3060 g. (30 mols) acetic acid anhydride 98%. After boiling under reflux for 4 hours the acetic acid/acetic acid anhydride mixture is removed under reduced pressure yielding 433 g. of a slowly crystallizing product. By recrystallization from 433 cc. isopropyl alcohol 359 g. (2.09 mols of triacetylmethylenediamine (M.P. 83–84° C.) is obtained.

EXAMPLE III

Preparation of a mixture of tri- and tetraacetylmethylenediamine 325 g. (2.5 mols) diacetylmethylenediamine (M.P. 200–200.5° C.) is dissolved by heating in 1530 g. (15 mols) acetic acid anhydride 98%.

With the aid of a fractionating column 160 g. of acetic acid is distilled off during the reaction at a bottom temperature of 140–145° C. in 4 hours.

From the reaction mixture the solvents are distilled off under reduced pressure yielding 490 g. crude product containing besides triacetylmethylenediamine also tetraacetylmethylenediamine.

By fractional distillation under reduced pressure 148 g. triacetylmethylenediamine, B.P. 129–131° C. at 2 mm. Hg and 301 g. tetraacetylmethylenediamine, B.P. 138–140° C. at 2 mm. Hg could be isolated from the crude product.

As indicated above, the compounds of this invention and mixtures thereof may be used in washing and/or bleaching textiles by incorporation thereof in washing and bleaching compositions togther with peroxy compounds including inorganic persalts such as perborates, percarbonates, perphosphates, persilicates, persulfates and, moreover, hydrogen peroxide and sodium peroxide. The above listed peroxy compounds have their bleaching effect substantially enhanced by use in combination with the novel activator compounds of this invention. In utilizing the novel compounds of this invention with peroxy compounds the former should be generally employed in such a quantity as corresponds to 0.5–4.0 nitrogen bound acetyl groups per atom of active oxygen in the peroxy compound.

The above examples are merely illustrative and the invention is not to be limited thereby except as defined in the appended claims since various modifications will be possible within the spirit and scope of the invention.

What is claimed is:

1. A compound having the formula

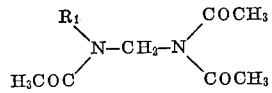

wherein $R_1$ is selected from the group consisting of H and $CH_3CO$.

2. N,N,N'N'-tetraacetylmethylenediamine.
3. N,N,N'-triacetylmethylenediamine.
4. A mixture of N,N,N'N'-tetraacetylmethylenediamine and N,N,N'-triacetylmethylenediamine.
5. The process for preparing a compound selected from the group consisting of N,N,N'N'-tetraacetylmethylenediamine and mixtures thereof with N,N,N'-triacetylmethylenediamine comprising heating N,N'-diacetylmethylenediamine with acetic acid anhydride while continuously distilling off acetic acid formed during the reaction.

References Cited by the Examiner

UNITED STATES PATENTS 1,534,525  4/1925  Hartmann et al. _____ 260—561

OTHER REFERENCES

Franchimont et al.: Rec. Trav. Chim., volume 30, pages 183–5 (1911).

Noller: Chemistry of Organic Compounds, 2d edition; pages 237 and 244, Philadelphia, Saunders; 1958.

IRVING MARCUS, *Primary Examiner.*

NICHOLAS S. RIZZO, WALTER A. MODANCE,
*Examiners.*